United States Patent [19]

Gartner et al.

[11] 4,168,682

[45] Sep. 25, 1979

[54] ELECTRONIC IGNITION TIMING SYSTEM USING DIGITAL RATE MULTIPLICATION

[75] Inventors: Todd H. Gartner, Elmhurst; Robert J. Valek, Wheaton, both of Ill.

[73] Assignee: Motorola, Inc., Schaumburg, Ill.

[21] Appl. No.: 779,974

[22] Filed: Mar. 22, 1977

[51] Int. Cl.$^2$ ............................. F02P 5/08; F02P 1/00
[52] U.S. Cl. ............................. 123/117 D; 123/148 E; 364/431; 364/442
[58] Field of Search ......... 123/117 D, 148 E, 32 AE, 123/32 EA; 364/431, 442

[56] References Cited

U.S. PATENT DOCUMENTS

| | | | |
|---|---|---|---|
| 3,749,073 | 7/1973 | Asplund | 123/117 D |
| 3,898,894 | 8/1975 | Aono et al. | 123/117 D |
| 3,927,648 | 12/1975 | Kawai et al. | 123/117 D |
| 4,009,699 | 3/1977 | Hetzler et al. | 364/431 |
| 4,036,190 | 7/1977 | Bigliani et al. | 364/431 |
| 4,060,714 | 11/1977 | Lappington et al. | 123/117 D |

Primary Examiner—Samuel W. Engle
Assistant Examiner—Thomas H. Webb
Attorney, Agent, or Firm—James W. Gillman; Donald J. Lisa; Phillip H. Melamed

[57] ABSTRACT

An electronic ignition timing system for an internal combustion engine which rotates a crankshaft is disclosed. The ignition system comprises a plurality of variable engine condition sensors which produce corresponding analog output signals and a crankshaft position sensor. A timing control logic circuit periodically multiplexes each of the variable engine condition sensors such that they are sequentially connected as inputs to an analog to digital (A/D) converter which produces an output signal comprising a pulse train for each of the multiplexed engine conditions. The total number of pulses in each pulse train is related to the magnitude of the variable engine condition currently being connected to the A/D converter. In addition, high resolution crankshaft position pulses are produced, preferably by an electronic angle divider which receives coarse crankshaft position pulses and produces high resolution crankshaft position pulses. The variable engine condition pulse trains and the high resolution crankshaft position pulses are then multiplexed to produce an input signal to a binary rate multiplier (BRM) which has its output connected to a counter. The input signal going to the BRM is monitored by a separate counter which controls the output of a read only memory (ROM) that determines the multiplication factor M of the BRM. The use of this separate counter to monitor the inputs of the BRM results in producing an output count from the BRM which is a non-linear function of the input signal, and this is accomplished with the use of a minimum number of memory cells in the ROM. A count related to the output count of the BRM for all of the multiplexed inputs is loaded into a phase counter which then proceeds to count down at a rate determined by the high resolution crankshaft position pulses. A latch circuit is then used to generate a spark timing signal when the count of the phase counter reaches a predetermined count. The spark timing pulses are produced at predetermined engine crankshaft positions related to the output count of the BRM wherein the output count is the summation of a plurality of non-linear output functions relating engine spark timing to the plurality of multiplexed variable engine conditions, including engine speed.

19 Claims, 4 Drawing Figures

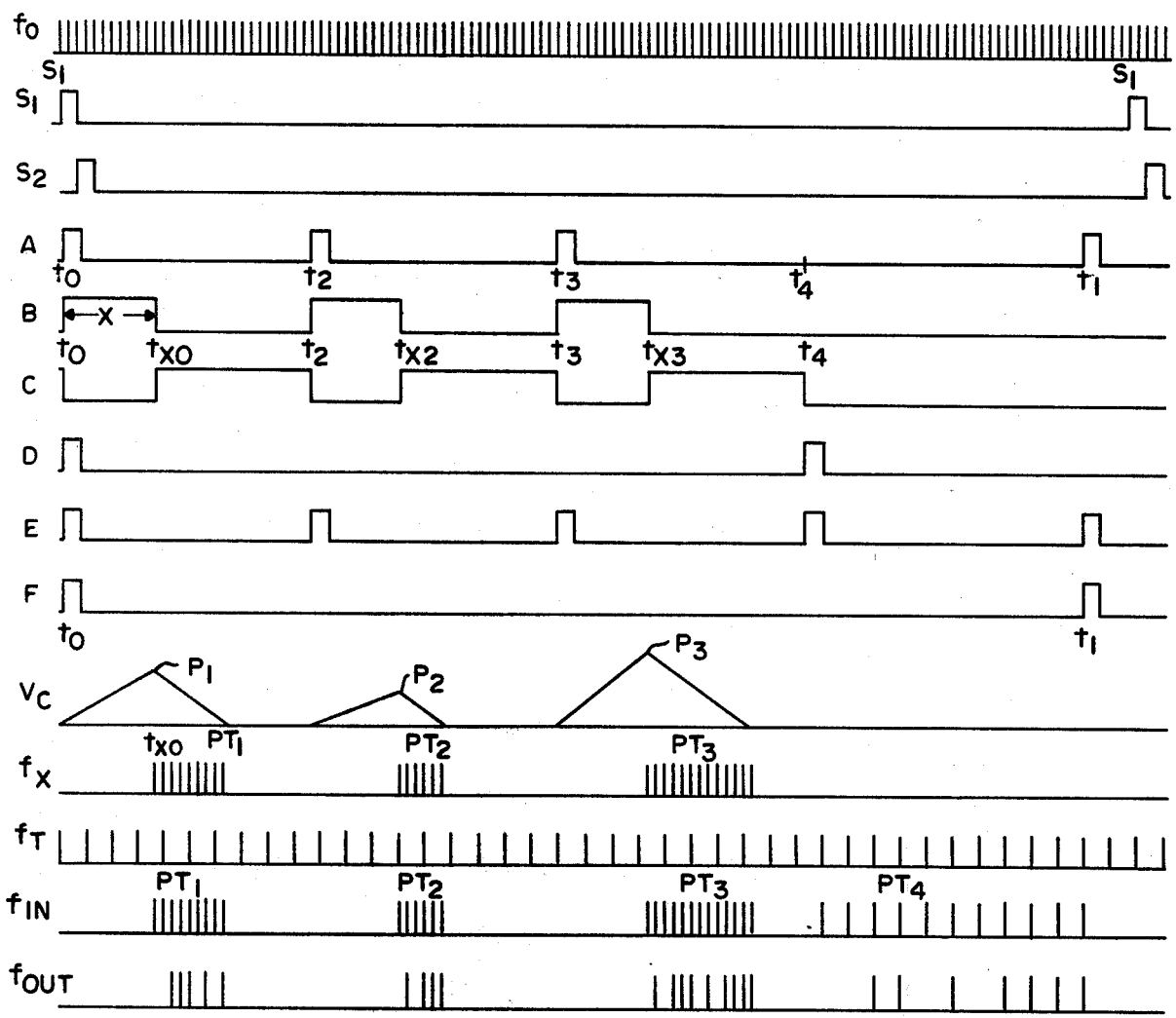
FIG. 2
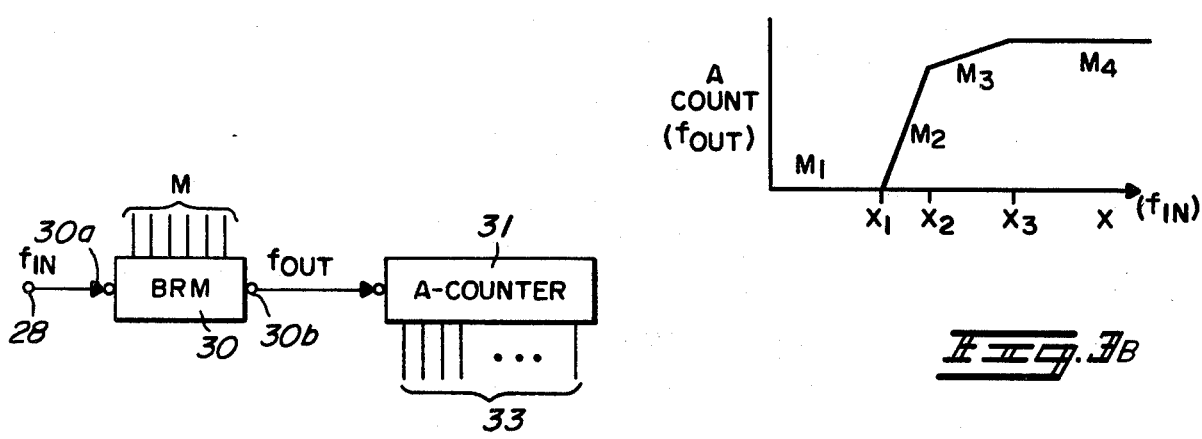
FIG. 3A
FIG. 3B

ELECTRONIC IGNITION TIMING SYSTEM USING DIGITAL RATE MULTIPLICATION

BACKGROUND OF THE INVENTION

The present invention is directed to the field of digital signal processing circuits and more particularly to electronic ignition timing systems which use such circuits.

Generally, digital circuits produce an output count which is a non-linear function of an input signal by first converting the input signal, if it is in analog form, to a digital input signal and then using a read only memory (ROM) which receives the digital input signal and produces a corresponding output signal that is generally coupled to a holding register which stores the output of the ROM. The non-linear relationship between the digital input signal to the ROM and the count stored in the holding register is obtained by having the ROM effectively perform a point by point plot, or table look up, in order to produce the desired relationship between the digital input signal and the output count stored in the holding register. This point by point plotting requires an extremely large memory capacity for the ROM in order to accurately produce the output count which has the desired non-linear relationship to the digital input signal. By requiring a large ROM memory, the cost of these type of prior art digital processing circuits has been relatively large and has thus discouraged their use in commercial products, such as electronic ignition timing systems for internal combustion engines.

Generally, electronic ignition timing systems have used complex and costly analog circuits in order to generate output functions which have a non-linear relationship to a sensed variable engine condition. Such circuits generally employ a plurality of zener diodes which break down at various voltages in order to produce a piecewise linear (and therefore non-linear) output function for a variable magnitude input signal related to a variable engine condition. The reason that such circuits have been used in the past is that it is well known that the desired spark timing advance characteristic verses engine speed has a piecewise linear shape over the entire range of anticipated engine speeds. In addition, the desired advance characteristic as a function of other engine variables has also been found to have a piecewise linear shape as a function of the magnitude of these other variables.

The prior art electronic ignition timing systems have used either complex and costly analog circuitry to produce output functions having a piecewise linear relationship to variable engine conditions, or they have used large capacity memory ROMs to produce point by point plotting of a non-linear output function as a function of a digital input signal. An example of such an analog ignition system is shown in a U.S. Pat. No. to Niemoeller, 3,785,356, and an example of such a digital electronic ignition system is shown in a U.S. Pat. No. to Asplund, 3,749,073.

SUMMARY OF THE INVENTION

An object of the present invention is to provide an improved digital processing circuit which overcomes all of the aforementioned disadvantages.

Another object of the present invention is to provide an improved electronic ignition timing system which uses digital processing circuitry and overcomes the aforementioned disadvantages of such system.

A more specific object of the present invention is to provide a digital processing circuit and a digital electronic ignition timing system which uses a digital rate multiplier that receives its multiplication control signal from a control means that monitors the input signal received by the rate multiplier, whereby the output of the rate multiplier is a non-linear function of the number of pulses received by the rate multiplier.

In one embodiment of the present invention a digital signal processing circuit is provided which comprises: means for producing a digital input signal comprising a pulse train; rate multiplier means coupled to the input signal producing means for receiving the input signal pulse train and producing a corresponding output pulse train by selectively multiplying (dividing) the input pulse train in accordance with received control signals; control means coupled to said rate multiplier means for producing and supplying control signals for controlling the multiplication of said rate multiplier means by counting the number of pulses in said input pulse train and producing at least a first control signal for input pulse train counts below a first predetermined count and at least a second control signal for input pulse train counts equal to or above said first predetermined count; and accumulator means for accumulating the pulse count of said output pulse train, whereby the accumulator count due to the output pulse train is a non-linear function of the number of pulses in said input pulse train.

Stating the embodiment of the present invention more specifically, an electronic ignition timing system for an engine which rotates a crankshaft is provided. The ignition timing system comprises: periodic means for producing an input pulse train within a predetermined time period, the total number of pulses in the input pulse train related to the magnitude of a variable engine condition; rate multiplier means coupled to said periodic means for receiving said input pulse train and producing a corresponding output pulse train by selectively multiplying (dividing) the input pulse train in accordance with received control signals; control means coupled to said rate multiplier means for producing and supplying control signals for controlling the multiplication of said rate multiplier means by counting the number of pulses in said input pulse train and producing at least a first control signal for input pulse train counts below a first predetermined count and at least a second control signal for input pulse train counts equal to or above said first predetermined count; accumulator means coupled to said rate multiplier means for receiving said output pulse train and accumulating the pulse count of said output pulse train, wherein the accumulated count due to said output pulse train is a non-linear function of the number of pulses in said input pulse train and therefore the accumulated count is also a non-linear function of the magnitude of said variable engine condition; and spark timing pulse generating means coupled to said accumulator means for monitoring the count in said accumuator means and producing spark timing pulses at predetermined engine crankshaft positions related to the accumuator means count.

In the previously mentioned embodiments, the existence of a large capacity, expensive ROM to produce a non-linear output signal as a function of an input signal has been negated by the use of a rate multiplier and circuitry which monitors the input signal and controls the multiplication of the rate multiplier.

BRIEF DESCRIPTION OF THE DRAWINGS

For a more complete understanding of the invention, reference should be made to the drawings, in which:

FIG. 2 is a series of graphs which illustrate various waveforms produced by the circuitry illustrated in FIG. 1; and FIG. 3A is a block diagram of a portion of the circuitry illustrated in FIG. 1, and FIG. 3B is a graph illustrating the transfer characteristic of the circuitry shown in FIG. 3A.

DESCRIPTION OF THE PREFERRED EMBODIMENT

Figure 1:
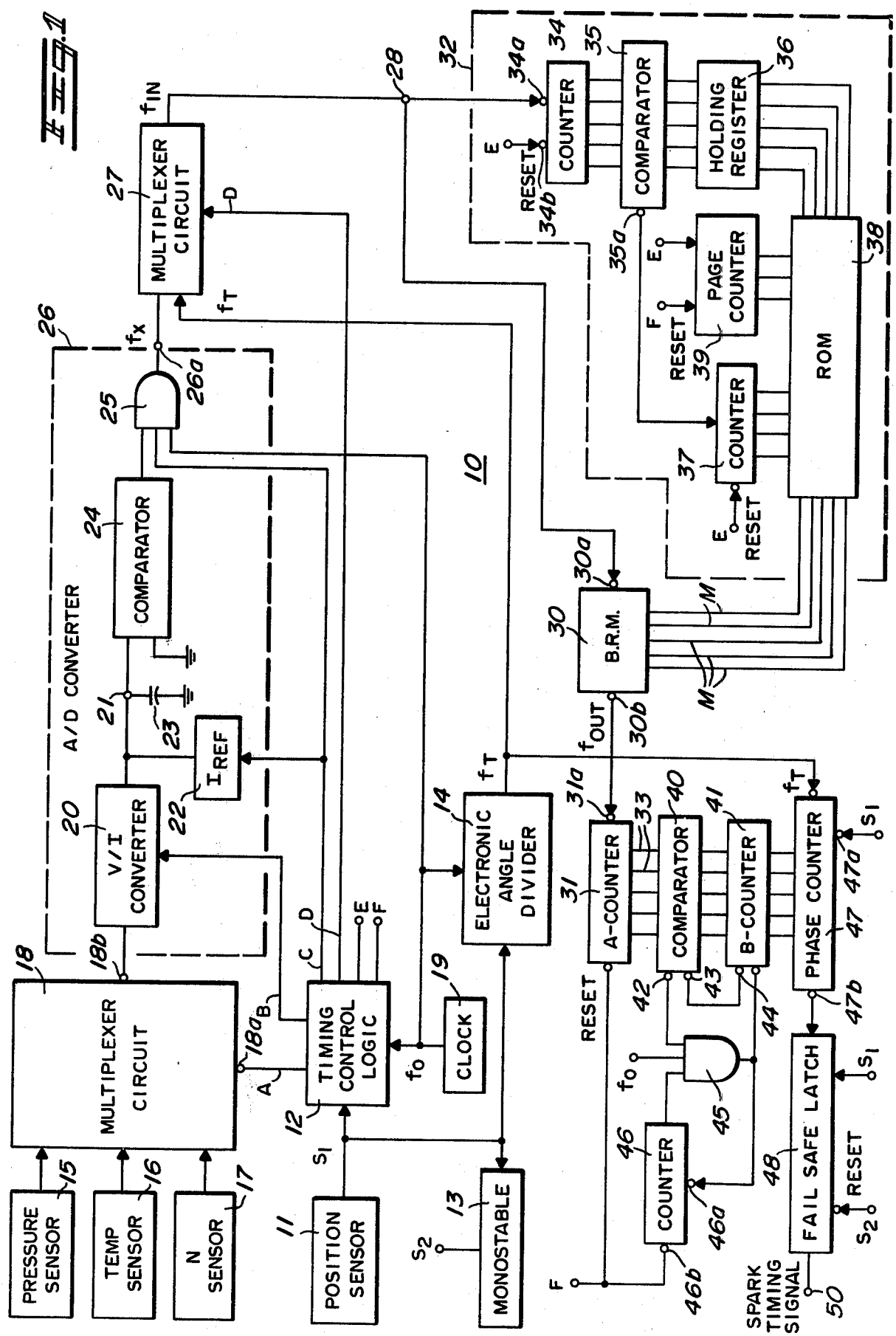
FIG. 1 is a schematic block diagram of an electronic ignition timing system embodying the present invention.

FIG. 1 illustrates an electronic ignition timing system 10 intended for use with an internal combustion engine (not shown) which rotates a crankshaft (not shown). The engine is provided with a crankshaft position sensor 11 that supplies a signal $S_1$ to a timing control logic circuit 12, a monostable multivibrator 13, and an electronic angle divider 14. The engine is also provided with a pressure sensor 15, a temperature sensor 16 and various other sensors which are intended to be illustrated by a block in FIG. 1 labelled N sensor 17. Each of the sensors 15 through 17 is contemplated as developing an analog voltage or current whose magnitude represents the magnitude of a corresponding variable engine operating condition, such as manifold pressure or engine coolant temperature. The sensors 15 through 17 are all coupled as inputs to a multiplexer circuit 18.

The signal $S_1$ represents either a digital pulse or a zero crossing signal which bears a precise relationship to a predetermined engine crankshaft rotatational position. In FIG. 2 the waveform $S_1$ is illustrated as comprising a short duration digital pulse which occurs at a specific predetermined engine crankshaft rotational position for each crankshaft revolution. Crankshaft position sensors are well known and generally consist of Hall sensors or magnetic pickup devices.

The signal $S_1$ is received by the monostable 13 which produces an output signal $S_2$, illustrated in FIG. 2, that consists of a short duration digital pulse created in response to the trailing edge of the pulses of the signal $S_1$. The function of the waveform $S_2$ will be explained in detail subsequently.

The timing control logic circuit 12 receives an input signal $f_o$ from a very high frequency clock 19 and produces control signals A, B, C, D, E and F which control the sequential operation and timing of various electronic circuits of the ignition timing system 10. The signal $S_1$ is also shown as being coupled to the timing control logic 12 and can be used for initiating the timing sequences created by the logic circuit 12, however this is not necessarily the case. In fact, in the preferred embodiment of the present invention, the occurrence of the signals A through F is not synchronized to the pulses of the signal $S_1$.

The electronic angle divider 14 receives the signal $S_1$ and also receives the high frequency clock pulses $f_o$ from the clock 19. The angle divider then produces an output signal $f_T$ which represents a signal having a frequency which is proportional to engine speed and consists of high resolution pulses which are uniformly spaced throughout each cycle of engine crankshaft rotation. The basic function of the electronic angle divider 14 is to produce a series of at least 25 uniformly spaced pulses throughout each crankshaft revolution and these pulses comprise the signal $f_T$. The function of the electronic angle divider can and has been implemented by the use of a multitooth rotary wheel attached to the engine crankshaft which produces a large number of high resolution pulses for each crankshaft revolution, wherein the frequency of the pulses produced is proportional to engine speed. Thus, each pulse in the signal $f_T$ will represent a specific engine crankshaft position and the spacing between these pulses will represent fixed amounts of degrees of engine crankshaft rotation. While the signal $f_T$ can be produced by a multitoothed wheel attached to the engine crankshaft, the angle divider 14 is contemplated as consisting of well known electronic circuitry which receives the coarse crankshaft position pulses from the sensor 11 and, by using the clock pulses $f_0$, equally divides these coarse pulses up into a large number of high resolution crankshaft position pulses. Such circuitry is well known to those skilled in the art and a suitable circuit configuration is shown in an article entitled "Transducers For Engine Management" by Mr. M. Bertioli, the article being published by the Society of Automotive Engineers as a paper, number 730576, which was given at an automobile engineering meeting in Detroit, Mich., on May 14–18, 1973.

The timing control logic circuit 12 basically comprises a series of counters and logic gates which receive the clock signals and periodically reproduce certain timing waveforms A through F (shown in FIG. 2) which control various circuits in the ignition system 10. The specific implementation of the control logic circuit 12 will not be discussed in detail since it is well known to those of average skill in the art as to how to construct such a circuit by using appropriate logic gates and counters. The periodic control waveforms produced by the logic circuit 12 are illustrated in FIG. 2. The period of these waveforms is illustrated as commencing at a time $t_0$ and extending to a subsequent time $t_1$.

A logic control signal A is produced by the logic circuit 12 and is coupled to a control terminal 18a of the multiplexer circuit 18. The multiplexer circuit 18 is a component well known to those of ordinary skill in the art. This circuit basically comprises a circuit which receives a plurality of inputs and provides an output at an output terminal by sequentially connecting each of the inputs to the output terminal in accordance with signals received at a control terminal. In the present case, the multiplexer circuit 18 receives the waveform A at its control input terminal 18a and sequentially connects each of the analog voltages produced by the sensors 15 through 17 to an output terminal 18b for predetermined time intervals determined by the waveform A. The basic circuitry of the multiplexer circuit 18 can be implemented with an integrated circuit such as an MC14539 integrated circuit which is sold by Motorola, Inc., a corporation of the State of Delaware in the United States.

The periodic waveform A consists of a short duration pulse occurring at the time $t_0$, another such pulse occurring at a later fixed time $t_2$ with respect to $t_o$ and a third such pulse occurring at a subsequent fixed time $t_3$. It is contemplated that when the multiplexer 18 receives the first pulse at the time $t_o$, the analog voltage produced by the pressure sensor 15 will be connected to the output terminal 18b. Whereas upon receipt of the second pulse at $t_2$ the output of the temperature sensor 16 will be connected to the output terminal 18b, and in response to the pulse at $t_3$ the output of the N sensor 17 will be connected to the terminal 18b. At the time $t_1$, the entire sequence begins again. Thus in response to the waveform A, the multiplexer 18 periodically sequentially connects all of the sensor outputs to the output terminal 18b at predetermined times which are determined by the waveform A.

While the time $t_0$ is illustrated in FIG. 2 as corresponding with the occurrence of a pulse on the waveform $S_1$ from the position sensor 11, this does not imply any causal relationship, and in fact the pulse at the beginning of the next time period (at $t_1$) is not synchronized with a crankshaft position pulse on the waveform $S_1$. The significance of this is that the period of the waveforms produced by the control logic circuit 12 is not related to the speed of engine crankshaft rotation in the preferred embodiment of the present invention.

The output terminal 18b of the multiplexer 18 is connected to a voltage to current (V/I) converter 20. This converter converts the analog voltage present at the terminal 18b into an output current having a magnitude related to the analog voltage. This output current is supplied to a summing terminal 21. A reference current generator 22 also supplies a reference current to the terminal 21 which is coupled to ground through a capacitor 23 and is coupled as an input to a comparator 24 that has another of its input terminals directly coupled to ground.

The converter 20 receives a timing control waveform B (shown in FIG. 2) from the control logic circuit 12, whereas the reference current generator 22 receives a control waveform C (FIG. 2) from the control logic circuit 12. The waveform B has the same period as the waveform A, as do all of the waveforms produced by the control logic circuit 12, and waveform B comprises three pulses which commence at the times $t_0$, $t_2$ and $t_3$, which end at times $t_{x0}$, $t_{x2}$ and $t_{x3}$ respectively, and which have a uniform duration X which is less than half of the time between the times $t_0$ to $t_2$ or $t_2$ to $t_3$. The waveform C, which also has the same period as the waveform A, is the inverse of the waveform B except that an additional change of state occurs at a time $t_4$ which is subsequent to the time $t_3$. Also the time between $t_3$ and $t_4$ is equal to the times between $t_2$ and $t_3$, and $t_0$ and $t_2$.

The waveform C is also illustrated as being coupled as an input to an AND gate 25 which receives another input from the comparator 24 and a third input from the clock 19 which supplies the signal $f_0$ as an input to the AND gate 25. The components 20 through 25 generally comprise an A to D converter 26 (shown dashed) which receives the analog multiplex inputs presented at the terminal 18b and produces a digital signal $f_x$ at an output terminal 26a of the AND gate 25.

The operation of the A to D converter 26 is as follows. In response to the pulse at $t_0$ on the waveform A, the multiplexer circuit 18 connects the pressure sensor 15 to the terminal 18b. In response to the pulse at the time $t_o$ on the waveform B, the V/I converter 20 converts the signal at the terminal 18b into a current for the duration X of the pulse at $t_o$. This current then charges up the capacitor 23. The waveform at the terminal 21 is designated as $V_c$ and is illustrated in FIG. 2. This waveform illustrates that during the duration X, the capacitor 23 charges up to a peak value $P_1$ which is related to the magnitude of the analog voltage produced by the pressure sensor 15 since the current produced by the converter 20 is directly related to this analog voltage.

At the termination of the duration X of the B pulse commencing at $t_0$, the converter 20 is deactivated and the reference current generator 22 is activated by the waveform C to discharge the capacitor 23 at a constant current rate. Thus the magnitude of the voltage at the terminal 21, as illustrated in FIG. 2, will decline at a constant rate from its peak at $P_1$ until the terminal 21 is at ground potential. This same sequence of events occurs when the temperature sensor 16 is connected to the terminal 18b, and when the N sensor 17 is connected to the terminal 18b.

The comparator 24 compares the voltage at the terminal 21 to ground potential and produces a high output signal which is coupled to the AND gate 25 whenever the potential at the terminal 21 is greater than ground potential. The AND gate 25 also receives the waveforms C and $f_o$ as inputs. This results in the output terminal 26a of the AND gate 25 having a waveform $f_x$ such as that shown in FIG. 2 in response to all of the waveforms previously discussed. Thus the signal $f_x$, which is the output of the A to D converter 26, comprises a first pulse train $PT_1$ whose duration is related to the analog output voltage of the pressure sensor 15, a second pulse train $PT_2$ whose duration is related of the temperature sensor 16 and a third pulse train $PT_3$ whose duration is related to the output of the N sensor 17. The pulse trains comprise all of the high frequency clock pulses which occur while the capacitor 23 is being discharged by the current generator 22. Since the clock output $f_0$ has a constant high frequency, the total number of pulses in each of the pulse trains also represents the magnitude of the corresponding engine sensor which created it. It should be noted that in FIG. 2 the waveform $V_c$ is illustrated with the sensor 15 supplying a higher magnitude analog output voltage than the sensor 16 but a smaller analog output voltage than the sensor 17. This was just done to illustrate the operation of the present invention and in no way forms a limitation on the present invention.

Thus essentially the converter 26 is really a dual slope A to D converter which produces high frequency pulse trains of durations related to the magnitudes of variable engine conditions. Since the basic principles of dual slope A to D converters are well known to those of skill in the art, further discussion of the converter 26 is not believed to be necessary.

The waveform $f_x$ is coupled as an input to a multiplexer circuit 27 which receives, as another input, the waveform $f_T$ which has a frequency that is engine speed dependent. The production of the waveform $f_T$ was previously discussed and will therefore not be discussed at this time. A waveform D from the timing control logic circuit 12 controls the multiplexer circuit 27 and results in this circuit producing a composite signal $f_{in}$ at a terminal 28. The waveform $f_{in}$ is shown in FIG. 2.

Essentially, the waveform $f_{in}$ comprises the waveform $f_x$ plus all of the $f_T$ pulses which exist between the time $t_4$ and the commencement of a new periodic cycle for the timing control logic circuit 12 at the time $t_1$. This is because the waveform D, shown in FIG. 2, comprises a short duration pulse at the time $t_0$ and another short duration pulse at the time $t_4$, and because the operation of the multiplexer 27 is essentially identical to that of the multiplexer 18. Thus the signal $f_{in}$ comprises the pulse trains $PT_1$, $PT_2$, $PT_3$ and an additional pulse train $PT_4$ which exists from the time $t_4$ till the time $t_1$ and has the frequency of the pulses in the waveform $f_T$. The other pulse trains $PT_1-PT_3$ have pulses occurring at the frequency of the clock signal $f_0$.

The waveform $f_{in}$ serves as an input to the digital signal processing circuitry which forms a major part of the present invention. This processing circuitry includes a binary rate multiplier (BRM) 30 which has an input terminal 30a connected directly to the terminal 28 and an output terminal 30b, at which a signal $f_{out}$ is developed, connected to the input terminal 31a of an A-counter 31. A control means 32 (shown dashed in FIG. 1 as comprising various components to be discussed subsequently) is illustrated as being connected to the terminal 28 and also to the BRM 30 by means of a plurality of control lines M. The control means 32 essentially counts each of the pulses in each pulse train being coupled to the input terminal 30a of the BRM and produces at least a first control signal for controlling the multiplication factor of the BRM 30 for a pulse train count below a first predetermined count and at least a second control signal for a pulse train count above or equal to the predetermined count. The A-counter 31 essentially accumulates the pulse count of the pulse train produced as the output of the BRM 30 and in this manner the accumulated count in the A-counter 31 will be a non-linear function of the number of pulses in each of the pulse trains received by the BRM 30. This will be discussed in greater detail subsequently.

Rate multipliers such as the BRM 30 are well known to those of average skill in the art. The rate multiplier is a circuit that produces an output pulse train whose frequency is proportional to the product of two inputs. One of these inputs is generally a clock frequency and the other is a preprogrammed multiplier number whose value is fixed at any given instant. The multiplier number is generally considered as any number between the range of 0 and 1. Thus in essence the rate multiplier is actually a divider type circuit which counts input pulses and produces an output pulse train in response to a variable division performed by the rate multiplier in accordance with a preprogrammed multiplier number generally designated as M. Such rate multipliers are commonly available and one such multiplier suitable for the BRM 30 is an integrated circuit CD4527B which is manufactured by Radio Corporation of America (RCA).

While the input to a rate multiplier is normally a continuous clock frequency, this does not have to be the case in order for the rate multiplier to function properly. In the present invention, the input to the BRM 30 is the waveform $f_{in}$ which comprises a series of four individual pulse trains $PT_1-PT_4$. In order to understand the basic operation of the control means 32, the rate multiplier 30 and the A-counter 31, reference should now be made to FIGS. 3A and 3B which best illustrate the operation of these elements.

FIG. 3A merely reproduces the BRM 30 and A-counter 31 as shown in FIG. 1. FIG. 3A illustrates that the A-counter 31 produces an output count which is designated by a plurality of lines 33. The BRM is also controlled by a plurality of lines which are designated by the letter M which represents the 0 to 1 multiplication factor which the BRM can be programmed to.

FIG. 3B illustrates a typical transfer characteristic of the circuitry shown in FIG. 3A as contemplated by the present invention. The transfer characteristic is shown in graph form with the vertical axis representing the accumulated count in the A-counter 31 and the horizontal axis representing the total number of pulses coupled into the BRM 30 in any single pulse train to be received by the BRM 30. Up until a count of $X_1$ pulses are received by the BRM 30, no pulses are counted by the A-counter 31 and the transfer characteristic comprises a horizontal section identified as $M_1$. When more than $X_1$ pulses have been received by the BRM 30 but fewer than the $X_2$ pulses have been received, the accumulated count in the counter 31 will increase at a rate represented by a straight line segment designated $M_2$. When more than $X_2$ pulses but fewer than $X_3$ pulses have been received by the BRM 30, the count in the A-counter 31 will increase at a slower rate represented by a line segment $M_3$ of the transfer characteristic. When more than $X_3$ pulses have been received by the BRM 30, no further count will be accumulated in the counter 31, and this is represented by another horizontal section of the transfer characteristic designated $M_4$.

The characteristic illustrated in FIG. 3B is precisely the general shape of the advance angle verses speed variation characteristic which is generally desired for internal combustion engines. Thus by appropriately selecting the points $X_1$, $X_2$ and $X_3$, which will be referred to as the break points of the transfer characteristic, and by designating the desired slopes required for the line segments $M_2$ and $M_3$, a desired non-linear, but piecewise linear accumulated count verses input pulse relationship can be implemented which will duplicate the desired advance verses engine speed relationship when the input pulses received are related to engine speed. This same principle can be extended to processing other engine condition variables with the same circuitry by merely changing the number and occurrence of the break points and the magnitude of the slope segments to produce the desired transfer characteristic. This is precisely what is done in FIG. 1 of the preferred embodiment.

In FIG. 1, pulse trains whose total number of pulses within predetermined time periods are related to variable engine conditions are sequentially processed by the binary rate multiplier 30 which implements an appropriate transfer characteristic for each of these pulse trains. The output of the rate multiplier for each of these input pulse trains represents a complex function representing the timing advance characteristic required for the engine for the specific magnitude of the variable engine condition which the pulse train corresponds to. These complex advance functions are then accumulated as the total count in the A-counter 31. Thus at the end of the cycle from $t_o$ to $t_1$, the count in the A-counter 31 represents the sum of four complex functions which relate four variable engine conditions to the amount of spark timing advance required according to the magnitude of each of those variable conditions. Thus, the function of the control means 32 is to control the break points and the slope of the M segments of each characteristic required for each of the variable engine conditions which generate the input pulse trains $PT_1-PT_4$ for the BRM 30. The operation of the control means 32 and its construction will now be discussed.

The control means 32 comprises a counter 34 having an input count terminal 34a directly coupled to the terminal 28. A reset terminal 34b of the counter 34 receives a waveform E from the timing control logic circuit 12. The waveform E, shown in FIG. 2, basically comprises short duration reset pulses which occur at the times $t_o$, $t_2$, $t_3$ and $t_4$. Thus the counter 34 is reset every time a new pulse train is expected to be received by the BRM 30. The count of the counter 34 is parallel coupled to a count comparator 35 which receives another parallel coupled count from a holding register 36. The comparator 35 merely compares the count of the counter 34 to the count in the holding register 36 and produces a high pulse at a terminal 35a when the counts are equal. Comparators such as the comparator 35 are well known to those of skill in the art and one such suitable comparator is an integrated circuit MCM14585 made by Motorola, Inc. The terminal 35a is connected to the input count terminal of a counter 37 which has its reset terminal also receiving the waveform E produced by the timing control logic circuit 12. The output of the counter 37 is coupled in parallel to a read only memory (ROM) 38. The ROM 38 provides parallel outputs to the holding register 36 and another set of parallel outputs to the BRM 30, where the second set of parallel outputs determines the multiplication factor of the BRM 30. A page counter 39 is illustrated as having its count coupled in parallel as an input to the ROM 38 and the counter 39 receives a counting input from the waveform E and is reset by a signal F which comprises short pulses at $t_o$ and $t_1$.

The operation of the control means 32 will now be described. At the time $t_o$, the waveform E resets the counters 34 and 37 and the waveform F resets the counter 39. In this condition, the ROM 38 will produce a count in the holding register 36 that corresponds to the first break point $X_1$ for the transfer characteristic to be implemented for the pulse train $PT_1$ which represents the magnitude of the manifold pressure as being sensed by the sensor 15. The ROM 38 also selects a multiplication M factor for the BRM 30 for all pulse counts for the pulse train $PT_1$ which are below this first break point $X_1$. The counter 34 counts each of the pulses in the pulse train $PT_1$ until it has a count equal to the break point $X_1$. At that time the comparator 35 produces an output pulse which increments the counter 37 and thereby changes the input to the ROM 38 and alters the break point number stored in the holding register 36 and also the multiplication factor used to control the BRM 30.

A similar sequence of events occurs as the counter 34 continues to count the pulses in the pulse train $PT_1$ until the second break point count $X_2$ now being held in the register 36 is equalled. These sequences continue until the time $t_2$ occurs which indicates that the pulse train $PT_1$ must have terminated. At the time $t_2$, the counters 34 and 37 are again reset and the page counter 39 is now incremented. The incrementing of the counter 39 provides a new input to the ROM 38 which now will select break points and multiplication values corresponding to the transfer characteristic desired for the second pulse train $PT_2$, which in the preferred embodiment represents the temperature magnitude sensed by the sensor 16. Here again the operation of the counters is similar to that which occurred during the processing of the pulse train $PT_1$ and the sequence is repeated for the pulse trains $PT_3$ and $PT_4$ until a final count is accumulated in the A-counter 31 which represents the additive combined complex piecewise linear functions of all of the multiplexed input engine variables as relating to the required engine advance which should be produced for the ignition spark pulses.

One of the primary advantages of the present invention is that the use of the binary rate multiplier 30 and its control means 32 enable the use of a low memory capacity ROM 38 to implement complex non-linear functions which represent the amount of engine spark timing advance required by a plurality of different engine operating variables. Only the break points and slope values must be stored in the ROM 38, and no point by point table look up is required for every input signal pulse, as would be the case if the prior art teachings were followed. The system illustrated by the present invention is readily modifiable to accommodate any number of engine condition sensors with only a moderate amount of complexity. This is because only a slightly larger ROM 38 need be provided which would then only need to store the M slope values and break points required for producing the transfer characteristic desired for the additional engine operating variables which are now desired to be monitored.

The count of the A-counter 31 is coupled in parallel to a comparator 40 which also receives a parallel count from a B-counter 41. When the count in the A-counter and B-counter are not equal, the comparator 40 will produce a positive signal at an output terminal 42. The comparator 40 also produces a signal at a terminal 43 which indicates whether the count in the A-counter 31 is greater or smaller than the count in the B-counter 41. The terminal 43 is directly connected to an up-down count control terminal 44 of the B-counter 41. The terminal 42 is connected as an input to an AND gate 45 which receives as a second input the waveform $f_o$ from the clock 19 and as a third input the output of a counter 46. The output of the AND gate 45 is connected to the input of the B-counter 41 and the count input terminal 46a of the counter 46. The counter 46 receives a preset enable signal at a terminal 46b in the form of the waveform F produced by the timing control logic circuit 12. The waveform F is also used to reset the A-counter 31 to a count of 0 so that the A-counter will be ready to receive all of the pulse trains which are produced in each period. The count of the B-counter 41 is also coupled in parallel to a phase counter 47 which receives a counting input from the waveform $f_T$ and has a preset enable terminal 47a which receives the signal $S_1$. The phase counter 47 produces an output signal at an output terminal 47b when its count has reached some predetermined count. The terminal 47b is coupled as a trigger input to a fail safe latch circuit 48 which also receives a trigger input from the signal $S_1$ and is reset by the signal $S_2$. The output of the fail safe latch 48 is coupled to a terminal 50 and this output represents a spark timing signal which has been generated with the appropriate phase shift. The operation of the components 40 through 50 will now be explained in detail.

The A-counter 31 is reset by the negative transition of the waveform F which will occur somewhat after the time $t_o$, but before the time $t_{xo}$ which indicates the start of the production of the first pulse train $PT_1$. The counter 46 is set to 0 on the positive going transition of the pulses of the waveform F. Thus at the time $t_o$, the counter 46 has a count of 0 and the A-counter 31 retains its count which it accumulated during the preceding cycle by the multiplexing of all of the variable engine condition inputs, the producing of complex functions as a result of them and the adding these functions together in the A-counter 31. This retained count is compared by the comparator 40 to the count maintained in the B-counter 41 and the comparator 40 produces a high signal when these counts are different and indicates to the B-counter 41, via the terminals 43 and 44, in which direction the B-counter 41 should count in order to approach the count contained in the A-counter 31. The counter 46 supplies a positive logic pulse to the AND gate 45 for all counts below some set predetermined count, such as a count of 20 for example. The result of this is that the AND gate 45 will pass at most 20 $f_o$ clock pulses through to the B-counter 41 and the counter 46. If during these 20 counts the B-counter 41 reaches the count being maintained in the A-counter 31, then the comparator 40 will terminate the counting sequence by opening the AND gate 45. If at the end of the 20 counts the B-counter 41 has not reached the count in the A-counter 31, the counter 46 will terminate the counting sequence by opening the AND gate 45. Thus the effect of the counter 46, the B-counter 41 and the comparator 40 is to provide a maximum slew rate for the counter 41 approaching the count being maintained in the counter 31. This is done to avoid erratic shifts in the accumulated count being stored in the B-counter 41 as a result of temporary engine condition readings which only last for one or two cycles of the period $t_o$ to $t_1$. It would not be desirable to have the count in the B-counter instantaneously reflect large changes in the readings of the engine condition sensors when these sensors would only be temporarily recording these readings.

Upon the occurrence of pulses on the signal $S_1$, the phase counter 47 is loaded with the count being maintained in the B-counter 41. This sort of loading operation is common in digital circuitry and is referred to as a preset enable count. When the count of the B-counter 41 is transferred to the phase counter 47, the counter 47 will start to count towards a predetermined count by counting the pulses of the signal $f_T$. The pulses of the signal $f_T$ represent, as was previously mentioned, discrete increments of crankshaft rotation. When a predetermined count of the phase counter 47 has been reached, a signal will be produced at the terminal 47b which will trigger the dual input latch 48 and produce a spark timing signal having a predetermined phase relationship to the occurrence of the pulse on the signal $S_1$ which loaded the count of the counter 41 into the phase counter 47. Thus the components 40–50 essentially produce a spark timing signal at predetermined engine crankshaft positions related to the count in the counters 31 and 41.

As a safety precaution, the fail safe latch 48 is provided with another input which is the pulses of the signal $S_1$. Thus if for some reason the phase counter 47 does not reach its predetermined count which will generate a spark timing signal, the occurrence of the pulse on the signal $S_1$ will trigger the fail safe latch 48. To reset the latch 48, the output of the monostable 13 which produces the reset signal $S_2$ is used.

While we have shown and described specific embodiments of this invention, further modifications and improvements will occur to those skilled in the art. All such modifications which retain the basic underlying principles disclosed and claimed herein are within the scope of this invention.

We claim:

1. An electronic ignition timing system for an engine which rotates a crankshaft, said ignition timing system comprising:
    periodic means for producing an input pulse train within a predetermined time period, the total number of pulses in the input pulse train related to the magnitude of a variable engine condition;
    rate multiplier means coupled to said periodic means for receiving said input pulse train and producing a corresponding output pulse train by selectively multiplying (dividing) the input pulse train in accordance with received control signals;
    control means coupled to said rate multiplier means for producing and supplying said control signals for controlling the rate multiplication of said rate multiplier means by counting the number of pulses in said input pulse train and producing at least a first control signal for input pulse train counts below a first predetermined count and at least a second control signal for input pulse train count equal to or above said first predetermined count;
    accumulator means coupled to said rate multiplier means for receiving said output pulse train and accumulating the pulse count of said output pulse train, wherein the accumulated count due to said output pulse train is a non-linear function of the number of pulses of said input pulse train and therefore the accumulated count is also a non-linear function of the magnitude of said variable engine condition; and
    spark timing pulse generating means coupled to said accumulator means for monitoring the count in said accumulator means and producing spark timing pulses at predetermined engine crankshaft positions related to the accumulator means count.

2. An electronic ignition timing system according to claim 1, wherein said periodic means includes means for sensing the magnitude of said variable engine condition and producing an analog signal related to said engine condition.

3. An electronic ignition timing system according to claim 1, wherein said periodic means includes circuitry for producing a second input pulse train within a second predetermined time period, the total number of pulses in said second input pulse train related to the magnitude of a second variable engine condition, and wherein said rate multiplier means sequentially receives both of said input pulse trains.

4. An electronic ignition timing system according to claim 3, wherein said control means produces at least a third control signal for second input pulse train counts below a second predetermined count and at least a fourth control signal for second input pulse train counts equal to or above said second predetermined count.

5. An electronic ignition timing system according to claim 4, wherein said accumulator means additively accumulates the pulse counts of said output pulse train due to both of said input pulse trains, whereby the additive accumulated count represents additive non-linear functions of the magnitude of two different variable engine conditions.

6. An electronic ignition timing system according to claim 1, wherein said control means comprises a counter for counting the number of pulses in said input pulse train and a ROM for producing said control signals in response to the count.

7. An electronic ignition timing system according to claim 6, wherein said control means includes a count comparator for comparing the count of said counter to programmable counts controlled by said ROM and altering the programmable counts of said ROM and the control signals produced by said ROM in response to the count of said counter equalling said programmable counts.

8. An electronic ignition timing system according to claim 1, wherein said spark timing pulse generating means includes means for insuring that a spark timing signal will be produced for each crankshaft revolution regardless of the count of said accumulator means.

9. An electronic ignition timing system according to claim 1, which includes a crankshaft position sensor for producing pulses related to engine crankshaft position and means coupled to said crankshaft position sensor for producing another input pulse train to be processed by said rate multiplier means, said control means and said accumulator means, wherein said other input pulse train has a frequency related to engine crankshaft rotational speed.

10. A digital signal processing circuit for producing an output which is a nonlinear function of an input signal, comprising:
means for producing an input signal comprising a pulse train;
rate multiplier means coupled to said input signal producing means for receiving said input pulse train and producing a corresponding output pulse train by selectively multiplying (dividing) the input pulse train in accordance with received control signals;
control means coupled to said rate multiplier means for producing and supplying control signals for controlling the multiplication of said rate multiplier means by counting the number of pulses in said input pulse train and producing at least a first control signal for input pulse train counts below a first predetermined count and at least a second control signal for input pulse train counts equal to or above said first predetermined count; and
accumulator means for accumulating the pulse count of said output pulse train, whereby the accumulated count due to said output pulse train is a non-linear function of the number of pulses in said input pulse train.

11. A digital signal processing circuit according to claim 10, wherein said control means comprises a counter for counting the number of pulses in said input pulse train and a ROM for producing said control signals in response to the count.

12. A digital signal processing circuit according to claim 11, wherein said control means includes a count comparator for comparing the count of said counter to programmable counts controlled by said ROM and altering the programmable counts of said ROM and the control signals provided by said ROM in response to the count of said counter equalling said programmable counts.

13. A digital signal processing circuit according to claim 12, which includes means for producing a second input pulse train within a second predetermined time period, and wherein said rate multiplier means sequentially receives both of said input pulse trains.

14. A digital signal processing circuit according to claim 13, wherein said control means produces at least a third control signal for second input pulse train counts below a second predetermined count and at least a fourth control signal for second input pulse train counts equal to or above said second predetermined count.

15. A digital signal processing circuit according to claim 14, wherein said accumulator means additively accumulates the pulse counts of said output pulse train due to both of said input pulse trains, whereby the additive accumulated count represents additive non-linear functions of the two different input pulse trains.

16. An electronic ignition timing system for an engine which rotates a crankshaft, said ignition timing system comprising:
means for producing an input pulse train of pulses related to the speed of engine crankshaft rotation,
rate multiplier means coupled to said pulse train means for receiving said input pulse train and producing a corresponding output pulse train by selectively multiplying (dividing) the input pulse train in accordance with received control signals;
control means coupled to said rate multiplier means for producing and supplying said control signals for controlling the rate multiplication of said rate multipler means by developing a running count related to the number of pulses occurring in said input pulse train and producing at least a first control signal for the developed count being below a first predetermined count and at least a second control signal for the developed count being equal to or above said first predetermined count;
accumulator means coupled to said rate multiplier means for receiving said output pulse train and accumulating the pulse count of said output pulse train, wherein the accumulated count due to said output pulse train is a non-linear function of the number of pulses of said input pulse train and therefore the accumulated count is also a non-linear function of crankshaft rotation; and
spark timing pulse generating means coupled to said accumulator means for monitoring the count in said accumulator means and producing spark timing pulses at predetermined engine crankshaft positions related to the accumulator means count.

17. An electronic ignition timing system according to claim 16, wherein said control means comprises a counter for developing a count related to the number of pulses occurring in said input pulse train and a ROM for producing said control signals in response to the developed count.

18. An electronic ignition timing system according to claim 17, wherein said spark timing pulse generating means includes means for insuring that a spark timing pulse will be produced during every predetermined amount of crankshaft revolution regardless of the count of said accumulation means.

19. An electronic ignition timing system according to claim 18, wherein said input pulse train means includes a crankshaft position sensor for producing pulses related to engine crankshaft position and means coupled to said crankshaft position sensor for producing said input pulse train to be processed by said rate multiplier means, said control means and said accumulator means.

* * * * *